United States Patent [19]

Kohlhammer et al.

[11] Patent Number: 5,474,638
[45] Date of Patent: Dec. 12, 1995

[54] METHOD OF USING AQUEOUS POLYMER DISPERSIONS AS LAMINATION ADHESIVES FOR GLOSSY FILMS

[75] Inventors: Klaus Kohlhammer, Marktl; Wilfried Huster, Emmerting; Walter Dobler, Tann, all of Germany

[73] Assignee: Wacker-Chemie GmbH, Munich, Germany

[21] Appl. No.: 201,266

[22] Filed: Feb. 24, 1994

[30] Foreign Application Priority Data

Mar. 4, 1993 [DE] Germany .......................... 43 06 822.2

[51] Int. Cl.⁶ ............................ C09J 129/02; B32B 7/12
[52] U.S. Cl. ..................... 156/308.2; 156/332; 524/547
[58] Field of Search ............................. 156/308.2, 308.4, 156/332; 524/547, 555, 561; 427/384, 385.5

[56] References Cited

U.S. PATENT DOCUMENTS

| | | | |
|---|---|---|---|
| 3,753,769 | 8/1973 | Steiner | 524/561 X |
| 3,843,581 | 10/1974 | Gibbs et al. | 524/547 X |
| 3,843,582 | 10/1974 | Gibbs et al. | 524/547 X |
| 3,843,583 | 10/1974 | Gibbs et al. | 524/547 X |
| 3,974,112 | 8/1976 | Nadker et al. | 524/501 |
| 4,073,779 | 2/1978 | Wiest et al. | 524/808 X |
| 4,291,090 | 9/1981 | Kenji et al. | 428/327 |
| 4,377,433 | 3/1983 | Merz et al. | 156/326 |
| 4,980,404 | 12/1990 | Aydin et al. | 524/100 |
| 5,219,918 | 6/1993 | Guillaume et al. | 524/547 |
| 5,278,225 | 1/1994 | Kohlhamer et al. | 524/555 X |
| 5,300,554 | 4/1994 | Krell et al. | 524/547 |

FOREIGN PATENT DOCUMENTS

| | | |
|---|---|---|
| 0307050 | 3/1989 | European Pat. Off. . |
| 0515719 | 12/1992 | European Pat. Off. ......... C08F 20/12 |
| 254949 | 3/1988 | German Dem. Rep. . |
| 3427647 | 2/1985 | Germany . |
| 4117487 | 12/1992 | Germany . |
| 9212213 | 7/1992 | WIPO ............................. C09J 133/06 |

OTHER PUBLICATIONS

Derwent Abstract DE 2809676.
Derwent Abstract JP 52042532 (JP-A 77/42532).
Derwent Abstract J60112874.
Derwent Abstract EP 515719.
Patent Abstracts of Japan vol. 18, No. 19 (C–1152) (6359) 5–255411, 5–255412, 5–255413.

Primary Examiner—Michael Ball
Assistant Examiner—Francis J. Lorin
Attorney, Agent, or Firm—Burgess, Ryan & Wayne

[57] ABSTRACT

The invention relates to a method of using aqueous polymer dispersions based on acrylate-methacrylate copolymers as lamination adhesives for heat sealed glossy films, where the aqueous polymer dispersions have a solids content of from 20 to 65% by weight, the copolymer has a glass transition temperature of from −35° to −10° C., a K value of from 40 to 100 and a mean particle size of less than 200 nm, and the copolymer is obtainable by free-radical emulsion polymerization of:

a) from 50 to 80 parts by weight of one or more comonomers from the group consisting of alkyl acrylates of alcohols having 2 to 10 carbon atoms, b) from 10 to 25 parts by weight of one or more comonomers from the group consisting of alkyl methacrylates of alcohols having 1 to 10 carbon atoms, and c1) from 0 to 10 parts by weight of one or more vinyl-aromatic comonomers, c2) from 0.1 to 4.0 parts by weight of one or more $\alpha,\beta$-unsaturated, monoolefinic carboxylic acids, c3) from 0 to 4.0 parts by weight of one or more $\alpha\beta$-unsaturated, monoolefinic carboxamides, c4) from 0 to 8 parts by weight of one or more comonomers from the group consisting of hydroxyalkyl (meth)acrylates made from esters of acrylic acid or methacrylic acid and diols having 2 to 10 carbon atoms, and c5) from 0.1 to 4.0 parts by weight of one or more $\alpha\beta$-unsaturated, monoolefinic compounds containing sulfonyl or sulfonate groups.

5 Claims, No Drawings

METHOD OF USING AQUEOUS POLYMER DISPERSIONS AS LAMINATION ADHESIVES FOR GLOSSY FILMS

BACKGROUND OF THE INVENTION

1) Field of the Invention

The invention relates to the use of aqueous polymer dispersions based on acrylate-methacrylate copolymers as lamination adhesives for glossy films.

2) Background Art

The lamination of printed papers or printed board with plastic films for the purpose of print finishing is a process which has been practiced for some time. Printed products are in this way protected against mechanical influences, are given a more attractive appearance, and can be presented in a visually more appealing manner due to the surface gloss thus achieved. Practical examples thereof are record sleeves, book covers, paperbacks, packaging materials for cosmetic articles and advertising materials.

The process of coating and bonding printed paper products by means of plastic films is known as lamination with glossy films. The adhesive employed is accordingly known as a lamination adhesive for glossy films and has the task of bonding the plastic film on the one hand to the printed paper on the other hand. At the beginning of this technological development, exclusively solvent-containing polymer resins were used, which were used either in one-component polyacrylate-based form or in two-component form as reactive polyurethanes. More stringent environmental protection regulations increasingly forced the avoidance of these solvent-containing systems and favored the use of aqueous polymer dispersions. In the case of the lamination films used, the trend increasingly developed in favor of polyolefin films, for example polyfilms (PE films) or oriented polypropylene films (OPP films). These are either flame- or corona-pretreated on their surface in order to improve the adhesion.

The first proposals for bonding flame- or corona-pretreated OPP films to printed paper or printed cardboard packaging by means of aqueous polymer dispersions are described in JP-A 77/42532 (Derwent Abstract) and in EP-A 46823 (U.S. Pat. No. 4,377,433). Both publications essentially describe the use of aqueous vinyl acetate-ethylene copolymer dispersions in which epoxide and amine functions have been incorporated as reactive components. At the time of use, the epoxide-containing and amine-containing vinyl acetate/ethylene dispersions are mixed with one another. These systems have a relatively short pot life and must be used immediately after mixing (2-component adhesive).

All other proposals for improving the bond strengths between polyolefin films and printed paper or board are also characterized by the use of reactive crosslinking agent systems. For example, in JP-A 60/112874, ethylene-vinyl acetate-acrylate dispersions are provided with good adhesion properties with the aid of water-soluble polyamine compounds. DE-A 3642485 (U.S. Pat. No. 4,980,404) recommends acrylate dispersions containing polyamino compounds for bonding plastic films to paper or board. DE-4117487 uses carbonylcontaining polymer dispersions which are crosslinked with the aid of multifunctional aminooxy compounds and thus achieve a significant improvement in adhesion on the corona-treated polyolefin surfaces. Other reactive systems which have been proposed are lattices containing itaconic acid (EP-A 307050). Water-soluble polymers have also been proposed for improving the adhesion in the lamination of glossy films in DD-A 254949 and U.S. Pat. No. 3,974,112.

WO-A 92/12213 describes the use of aqueous dispersions of copolymers of (meth)acrylates of $\alpha\beta$-unsaturated carboxylic acids and (meth)acrylates of alkylsulfonic acids as adhesives for the lamination of substrates, where the substrates to be bonded should preferably be selected from the group consisting of polymer films, printed paper, metal-coated paper and metal foils. The systems described therein were intended to replace solvent-containing adhesives or hot-melt adhesives in the production of laminates. The specific problems of lamination with glossy films (gloss and transparency of the laminates) are not discussed.

The object of the invention was to develop an aqueous polymer dispersion which guarantees good bond strength between an optionally corona- or flame-pretreated polyolefin film on the one hand and printed paper or printed cardboard packaging on the other hand, even without the above-mentioned reactive crosslinking agent systems, to give laminates having excellent gloss and transparency.

SUMMARY OF THE INVENTION

The invention relates to the use of aqueous polymer dispersions based on acrylate-methacrylate copolymers as lamination adhesives for glossy films, where the aqueous polymer dispersions have a solids content of from 20 to 65% by weight, the copolymer has a glass transition temperature of from $-35°$ to $-10°$ C., a Fikentscher K value of from 40 to 100 and a mean particle size of less than 200 nm, and the copolymer is obtainable by free-radical emulsion polymerization of:

a) from 50 to 80 parts by weight of one or more comonomers from
the group consisting of alkyl acrylates of alcohols having 2 to 10 carbon atoms, and b) from 10 to 25 parts by weight of one or more comonomers from the group consisting of alkyl methacrylates of alcohols having 1 to 10 carbon atoms, and c1) from 0 to 10 parts by weight of one or more vinyl-aromatic comonomers, c2) from 0.1 to 4.0 parts by weight of one or more $\alpha\beta$-unsaturated, monoolefinic carboxylic acids, c3) from 0 to 4.0 parts by weight of one or more $\alpha\beta$-unsaturated, monoolefinic carboxamides, c4) from 0 to 8 parts by weight of one or more comonomers from the group consisting of hydroxyalkyl (meth)acrylates made from esters of acrylic acid or methacrylic acid and diols having 2 to 10 carbon atoms, and c5) from 0.1 to 4.0 parts by weight of one or more $\alpha,\beta$-unsaturated, monoolefinic compounds containing sulfonyl or sulfonate groups.

Examples of suitable alkyl acrylates are ethyl acrylate, propyl acrylate, n-butyl acrylate and 2-ethyl-hexyl acrylate. The copolymers preferably contain ethyl-hexyl acrylate and/or n-butyl acrylate.

Examples of suitable alkyl methacrylates are methyl methacrylate, ethyl methacrylate, propyl methacrylate and n-butyl methacrylate. The copolymers preferably contain methyl methacrylate, particularly preferably in an amount of from 15 to 20 parts by weight.

An example of a suitable vinylaromatic compound c1) is styrene. Examples of $\alpha\beta$-unsaturated, monoolefinic carboxylic acids c2) are acrylic acid, methacrylic acid, crotonic acid, itaconic acid, maleic acid and fumaric acid. Examples of α,β-unsaturated, monoolefinic carboxamides c3) are acrylamide and methacrylamide. Examples of suitable hydroxyalkyl (meth)acrylates c4) made from esters of acrylic acid or methacrylic acid and diols having 2 to 10 carbon atoms are hydroxyethyl acrylate and hydroxypropyl methacrylate. Examples of suitable α,β-unsaturated, monoolefinic compounds c5) containing sulfonyl or sulfonate groups are sodium styrene sulfonate, styrene sulfonic acid, acrylamidopropanesulfonic acid, vinyl sulfonate and disulfoalkyl esters of itaconic, maleic or fumaric acid.

DESCRIPTION OF THE PREFERRED EMBODIMENTS

In a preferred embodiment, the comonomer phase contains:

a) from 50 to 80 parts by weigh of one or more comonomers from the group consisting of ethylhexyl acrylate and n-butyl acrylate, b) from 10 to 25 parts by weight of methyl methacrylate, c1) from 0.5 to 10 parts by weight of styrene, c2) from 0.1 to 4.0 parts by weight of one or more comonomers from the group consisting of acrylic acid, methacrylic acid and crotonic acid, c3) from 0.1 to 4.0 parts by weight of one or more comonomers from the group consisting of acrylamide and methacrylamide, c4) from 0.5 to 8 parts by weight of one or more comonomers of the group consisting of hydroxyethyl acrylate and hydroxypropyl methacrylate, and c5) from 0.1 to 4.0 parts by weight of one or more comonomers from the group consisting of acrylamidopropanesulfonic acid, vinyl sulfonate, styrenesulfonic acid and the corresponding salts.

In particular, the solids content of the aqueous polymer dispersions which can be prepared by emulsion polymerization of the above-mentioned comonomer compositions is from 30 to 55% by weight, where the polymer has a glass transition temperature of from −25° to −15° C. and a K value of from 70 to 100, and a mean particle size of 150 nm and a Brookfield viscosity (20 rpm) of 1000 mPas, preferably less than 500 mPas.

The aqueous polymer dispersions are prepared by emulsion polymerization, using the batch or feed method or with initial introduction of a portion of individual components, the remainder being metered in during the polymerization. The polymerization temperature is between 0° and 100° C.

In order to initiate the polymerization, the thermal or redox initiator systems which are conventional in emulsion polymerization can be used. In general, the initiation is carried out by means of water-soluble free-radical formers, which are preferably employed in amounts of from 0.4 to 3.0% by weight, based on the total weight of the monomers. Examples of these are ammonium and potassium persulfate and peroxodisulfate; hydrogen peroxide; azo compounds, such as azobisisobutyronitrile or azobiscyanovaleric acid. In the case of thermal initiation, the polymerization is preferably carried out at between 60° and 100° C. The free-radical formation can be accelerated at lower temperatures, preferably below 60° C., with the aid of reducing agents, such as alkali metal formaldehydesulfoxylates, alkali metal sulfites, bisulfites and thiosulfates, and ascorbic acid.

Dispersants which can be used are all anionic and nonionic emulsifiers conventionally used in emulsion polymerization. From 1 to 6% by weight, based on the total weight of the monomers, of emulsifier are preferably employed.

Examples of suitable emulsifiers are anionic surfactants, such as alkyl sulfonates having a chain length of from 8 to 18 carbon atoms, alkyl and alkylaryl ether sulfates having 8 to 18 carbon atoms in the hydrophobic radical and up to 40 ethylene oxide or propylene oxide units, alkyl or alkylaryl sulfonates having 8 to 18 carbon atoms, esters and monoesters of sulfosuccinic acid with monohydric alcohols or alkylphenols. Examples of suitable nonionic surfactants are alkylpolyglycol ethers and alkylaryl polyglycol ethers having 8 to 40 ethylene oxide units.

The pH range desired for polymerization, which is generally between 2.5 and 10, preferably between 3 and 8, can be established in a known manner by acids, bases or conventional buffer salts, such as alkali metal phosphates or alkali metal carbonates. In order to adjust the molecular weight (K value), conventional regulators, for example mercaptans, aldehydes and chlorinated hydrocarbons, can be added during the polymerization.

A preferred procedure involves initially introducing a portion of the comonomer mixture and the emulsifier, heating the batch to the polymerization temperature, and the polymerization is subsequently initiated by metering in a small amount of initiator. The remainder of the comonomers and initiator are added by the feed method from a preemulsion prepared in advance.

A particularly preferred procedure involves initially introducing from 2 to 10% by weight of the acrylate, methacrylate and emulsifier, heating the reaction batch to a temperature of from 60° to 100° C., initiating the polymerization by addition of from 1.0 to 2.5% by weight of the initiator, and metering in the remainder of the comonomer mixture, emulsifier and initiator as a preemulsion at the rate at which they are consumed.

In the use according to the invention of the aqueous polymer dispersions as binders in the lamination of glossy films, printed cardboard packaging and papers are generally adhesively bonded over the entire area to plastic films, preferably polyolefin films, which may have been flame- and/or corona-pretreated, polyester films and cellulose acetate films. To this end, the aqueous polymer dispersion is generally applied, in a manner known to a person skilled in the art, to the pretreated side of the plastic film, preferably in a thickness of from 5 to 50 μm, and is subsequently dried. To produce the laminates, the dried polymer film is covered with the paper or cardboard sheet to be laminated and is heat-sealed at a suitable temperature and under pressure, preferably at a temperature of from 50° to 100° C. and under a pressure of from 2 to 6 bar.

In the use according to the invention of the aqueous polymer dispersions with the above-mentioned copolymer compositions, an adhesive film which gives high-quality, stable adhesive bonds for very thin adhesive layers is formed after the drying step, even at very low application rates. When used in the lamination of glossy films, where the optical properties of the laminate are particularly important, products are obtained which are distinguished by excellent transparency and gloss.

In contrast to 2-component adhesives for the lamination of glossy films, which contain reactive water-soluble or water-emulsifiable crosslinking agent systems, the aqueous polymer dispersions are distinguished by a virtually unlimited shelf life and pot life. The omission of reactive crosslinking agent systems also results in superior rheological properties of the aqueous polymer dispersions, which enable both manual processing and processing on high-speed machines.

The examples below serve to further illustrate the invention.

Preparation of the polymer dispersions:

EXAMPLE 1

Three metering solutions were prepared:

Initiator solution I: 0.06 g of potassium persulfate were dissolved in 8.5 ml of water.

Initiator solution II: 5.1 g of potassium persulfate were dissolved in 100 ml of water and 0.5 g of $NH_3$ (12% strength).

Preemulsion: 69.3 parts by weight (577 g) of n-butyl acrylate, 19.0 parts by weight (158 g) of methyl methacrylate, 1.75 parts by weight (14.6 g) of styrene, 4.7 parts by weight (39.8 g) of hydroxypropyl methacrylate, 0.65 part by weight (5.4 g) of acrylic acid, 0.65 part by weight (18.1 g of 30% strength solution) of acrylamide, 0.27 part by weight (2.23 g) of sodium styrenesulfonate and 27.1 g of a 35% strength solution of a nonylphenol 25 ethylene oxide sulfate (Rewopol NOS25) were emulsified in 274 ml of water. 3.7 parts by weight (29.8 g) of n-butyl acrylate, 1.0 part by weight (8.2 g) of methyl methacrylate, 0.43 part by weight (3.6 g) of styrene, 0.2 part by weight (2.0 g) of hydroxypropyl methacrylate, 0.09 part by weight (2.4 g in 30% strength solution) of acrylamide, 0.02 part by weight (0.18 g) of sodium styrenesulfonate and 17.8 g of a 35% strength solution of a nonylphenol 25 ethylene oxide sulfate (Rewopol NOS25) were introduced, along with 441 ml of water, into a stirred reactor fitted with reflux condenser and internal thermometer, and the mixture was warmed to 80° C. When the temperature equilibrium had been reached, the two initiator solutions were commenced simultaneously, with the metering rates being selected corresponding to a metering time of 10 minutes for initiator solution I and of about 3.5 hours for initiator solution II. Immediately after the noticeable commencement of an exothermic reaction, the preemulsion was introduced at a constant metering rate; the metering time was 3 hours. When the metering was complete, the polymerization was completed by stirring for 30 minutes at 80° C.

A speck-free dispersion having a solids content of 50.3% by weight and a mean particle size of 90 nm was obtained. The K value (measured in THF) of the polymer was 93.1, and the glass transition temperature was Tg=−16 2° C. A solids content of 47% by weight was established by dilution.

EXAMPLE 2

The procedure was analogous to Example 1, using the amounts of comonomer, emulsifier and initiator given in Table 1. The solids content, K value, particle size and glass transition temperature are likewise given in Table 1.

COMPARATIVE EXAMPLE 1

The procedure was analogous to Example 1, using the amounts of comonomer, emulsifier and initiator given in Table 1. In contrast to Example 1, only about 0.4 times the amount of initiator was employed, so that a polymer having a K value of >100 was obtained.

COMPARATIVE EXAMPLE 2

The procedure was analogous to Comparative example 1, using the amounts of comonomer, emulsifier and initiator given in Table 1.

TABLE 1

| Recipe [parts by weight] | Example 1 | Example 2 | Comp. ex. 1 | Comp. ex. 2 |
|---|---|---|---|---|
| BuA | 73.0 | 77.0 | 73.0 | 77.0 |
| MMA | 20.0 | 16.0 | 20.0 | 16.0 |
| STY | 2.18 | 2.18 | 2.18 | 2.18 |
| HPMA | 4.90 | 4.90 | 4.90 | 4.90 |
| AA | 0.74 | 0.74 | 0.74 | 0.74 |
| AS | 0.65 | 0.65 | 0.65 | 0.65 |
| NaSS | 0.29 | 0.29 | 0.29 | 0.29 |
| Solids content [% by wt.] | 47.0 | 47.0 | 49.7 | 49.6 |
| K value | 93.1 | 93.1 | 101 | 103 |
| Particle size [nm] | 90 | 102 | 106 | 113 |
| Glass transition temp. [°C.] | −16.2 | −21.4 | −16.8 | −21.4 |
| Viscosity [mPas] | <500 | <500 | 220 | 480 |

BuA: n-butyl acrylate, MMA: methyl methacrylate, STY: styrene, HPMA: hydroxypropyl methacrylate, AA: acrylamide, AS: acrylic acid, NaSS: sodium styrene sulfonate.

Applicational testing:

The following substrates were used to prepare the laminates:

F1: PE film (polyethylene), 50 μm thick, surface tension (untreated)=28–30 mN/m, in-house corona treatment using a Softal Electronic type HR-1R AB300 Corona F2: OPP film (oriented polypropylene), 12 μm thick, pretreated on both sides, manufacturer: LONZA, type Ultralen K F3: OPP film, 30 μm thick, pretreated on one side, manufacturer: type Biafol P1: High-quality paper and board, printed with Reflex Blue No. 62105, Epple Druckfarben P2: Multicolor print cardboard packaging The adhesive coating was carried out on the pretreated side of the film in a thickness of 12 μm (wet), corresponding to 5.7 g/m² (dry), dried for 3 minutes at 80° C. and subsequently covered with the print sheet. In order to produce the laminates, the test specimens were heat-sealed at 80° C. and 3 bar for 3 seconds. After appropriate storage of the laminates, the bond strength (peel strength/180°) of the laminates was determined by means of a Zwick 1445 material testing machine at a peel rate of 300 mm/min.

The laminates are assessed from the results obtained using the material testing machine: if the bonding is poor, the laminated film can be peeled off using a measurable force (peel strength)—corresponding numerical values are given in Table 2. Good bonds are distinguished by the fact that the laminated film cannot be peeled off. In these cases, either printing ink transfer from the paper to the film, draw-out of printing ink from the paper or tearing-out of the paper occurs during the peel test in the testing machine; in addition, tearing of the laminated film can occur. Results of applicational testing are shown in Table 2 for the individual laminates.

TABLE 2

| Laminate/ storage time | Example 1 | Example 2 | Comp. ex. 1 | Comp. ex. 2 |
|---|---|---|---|---|
| F1-P2/5 min | IT/PT | IT/PT | 1.32/AT | 1.39/AT |
| F2-P2/5 min | FT | FT | — | — |
| F3-P2/5 min | IT/PT | IT/PT | — | — |
| F1-P2/4 h | IT/PT | IT/PT | 1.50/AT | 1.42/AT |
| F2-P2/4 h | FT | FT | — | — |

TABLE 2-continued

| Laminate/<br>storage time | Example 1 | Example 2 | Comp.<br>ex. 1 | Comp.<br>ex. 2 |
|---|---|---|---|---|
| F3-P2/4 h | IT/PT | IT/PT | — | — |
| F1-P2/2 d | IT/PT | IT | 1.30/AT | 1.33/AT |
| F2-P2/2 d | FT | FT | — | — |
| F3-P2/2 d | IT/PT | IT | — | — |

IT: printing ink transfer;
FT: film tear;
PT: paper tear;
AT: adhesive transfer from film to print sheet The novel dispersions of lamination adhesives for glossy films of Example 1 and Example 2 are peel-resistant immediately after production of the laminate; in the tensile testing machine, either printing ink transfer from a print sheet to adhesive-coated films was observed or paper tearing or film tearing occurred. By contrast, the laminates containing adhesives of Comparative examples 1 and 2 were easy to peel, and in addition adhesive transfer from the film surface to the print sheet occurred.

What is claimed is:

1. A process for laminating a glossy polymer film to a paper or cardboard substrate-which comprises:

(1) applying to said glossy polymer film an aqueous polymer dispersion based on acrylate-methacrylate copolymers, said dispersion having a solids content of from 20 to 65% by weight, the copolymer having a glass transition temperature of from −35° to −10° C., a Fikentscher K value of from 40 to 100 and a mean particle size of less than 200 nm, and the copolymer is obtainable by free-radical emulsion polymerization of a comonomer phase containing:

a) from 50 to 80 parts by weight of one or more comonomers from the group consisting of alkyl acrylates of alcohols having 2 to 10 carbon atoms, b) from 10 to 25 parts by weight of one or more comonomers from the group consisting of alkyl methacrylates of alcohols having 1 to 10 carbon atoms, c1) from 0.5 to 10 parts by weight of styrene, c2) from 0.1 to 4.0 parts by weight of one or more α,β-unsaturated, monoolefinic carboxylic acids, c3) from 0 to 4.0 parts by weight of one or more α,β-unsaturated, monoolefinic carboxamides, c4) from 0 to 8 parts by weight of one or more comonomers selected from the group consisting of hydroxyalkyl acrylates and hydroxylalkyl methacrylates made from esters of acrylic acid or methacrylic acid and diols having 2 to 10 carbon atoms, and c5) from 0.1 to 4.0 parts by weight of one or more comonomers selected from the group consisting of acrylamido-propane sulfonic acid, vinylsulfonic acid, styrene sulfonic acid and the salts thereof, (2) allowing said aqueous dispersion to dry, (3) applying the thus obtained coated polymer film to said substrate with the coat in contact with said substrate, and (4) laminating said glossy polymer film to said substrate by heat-sealing at an elevated temperature and under pressure.

2. The process of claim 1 wherein the comonomer phase contains:

a) from 50 to 80 parts by weight of one or more comonomers from the group consisting of ethylhexyl acrylate and n-butyl acrylate, b) from 10 to 25 parts by weight of methyl methacrylate, c1) from 0.5 to 10 parts by weight of styrene, c2) from 0.1 to 4.0 parts by weight of one or more comonomers from the group consisting of acrylic acid, methacrylic acid and crotonic acid, c3) from 0.1 to 4.0 parts by weight of one or more comonomers from the group consisting of acrylamide and methacrylamide, c4) from 0.5 to 8 parts by weight of one or more comonomers of the group consisting of hydroxyethyl acrylate and hydroxypropyl methacrylate, and c5) from 0.1 to 4.0 parts by weight of one or more comonomers from the group consisting of acrylamidopropanesulfonic acid, vinylsulfonic acid, styrenesulfonic acid and the salts thereof.

3. The process as claimed in claim 1 wherein the solids content of the aqueous polymer dispersion is from 30 to 55% by weight, where the polymer has a glass transition temperature of from −25° to −15° C., and a K value of from 70 to 100 and a mean particle size of 150 nm and a Brookfield viscosity (20 rpm) of 1000 mPas.

4. The process as claimed in claim 1 wherein the aqueous polymer dispersion in the lamination of glossy films is applied to plastic films over the entire area, in a thickness of from 5 to 50 µm, is subsequently dried.

5. A process for the production of laminates which comprises covering the dried plastic film of claim 4 with paper or cardboard packaging sheet and heat sealing at a suitable temperature and under pressure.

* * * * *